United States Patent [19]

Simpson et al.

[11] Patent Number: 5,672,201

[45] Date of Patent: *Sep. 30, 1997

[54] COMPOSITE PIGMENTARY MATERIAL

[75] Inventors: Leslie Ainsley Simpson, Normanby; Keith Robson, Whitesmock; David Trevor Knight, Northallerton; Ronald Brown, Stockton, all of England

[73] Assignee: Tioxide Group Services Limited, United Kingdom

[*] Notice: The term of this patent shall not extend beyond the expiration date of Pat. No. 5,554,215.

[21] Appl. No.: 611,300

[22] Filed: Mar. 5, 1996

[30] Foreign Application Priority Data

Mar. 11, 1995 [GB] United Kingdom ............ 9504962

[51] Int. Cl.$^6$ .................................................. C04B 14/20
[52] U.S. Cl. .................. 106/447; 106/416; 106/419; 106/421; 106/425; 106/437; 106/450; 106/453; 106/455; 106/460; 106/461; 106/471; 106/486; 106/487; 106/491
[58] Field of Search .............................. 106/436, 416, 106/419, 421, 425, 437, 450, 453, 455, 460, 461, 471, 486, 487, 491

[56] References Cited

U.S. PATENT DOCUMENTS

| 3,453,131 | 7/1969 | Fadner | 106/416 |
|---|---|---|---|
| 5,078,793 | 1/1992 | Caton | 106/417 |
| 5,152,835 | 10/1992 | Nemeh | 106/437 |
| 5,229,339 | 7/1993 | Pujari et al. | 501/96 |
| 5,344,487 | 9/1994 | Whalen-Shaw | 106/416 |
| 5,454,864 | 10/1995 | Whalen-Shaw | 106/416 |
| 5,554,215 | 9/1996 | Simpson et al. | 106/419 |

FOREIGN PATENT DOCUMENTS

| 0 203 713 | 12/1986 | European Pat. Off. |
| 61-51061 | 3/1986 | Japan. |
| 4-332766 | 11/1992 | Japan. |
| 1 352 618 | 5/1974 | United Kingdom. |
| 2 267 503 A | 12/1993 | United Kingdom. |
| 2 284 598 A | 6/1995 | United Kingdom. |
| WO93/11183 | 6/1993 | WIPO. |
| WO93/12183 | 6/1993 | WIPO. |
| WO93/12184 | 6/1993 | WIPO. |

OTHER PUBLICATIONS

"Properties of Microfiltration Membranes" W.R. Bowen et al. I. Chem. E. Symp. Ser. No. 118, pp. 107–118, Apr. 1990.

"Ultrafiltration of Colloidal Suspension" M. C. Porter A.I. Ch.E. Symp. Ser., 1972, vol. 68, Part 120, pp. 21–30 (no month).

*Primary Examiner*—Mark L. Bell
*Assistant Examiner*—Scott L. Hertzog

[57] ABSTRACT

A process for preparing a structured composite pigmentary material comprises forming a dispersion of uncoated particles of titanium dioxide at a pH value at which the particles have a surface charge and subjecting the dispersion to cross-flow filtration until the dispersion contains more than 50% by weight titanium dioxide. The concentrated dispersion is mixed with a dispersion of chemically distinct particles having a surface charge of opposite sign under conditions which ensure that the sign of the surface charge on either of the particulate materials is not reversed. In the resultant composite pigmentary material the titanium dioxide particles are held in association with the chemically distinct particles as a result of said surface charges. The structured composite can be used to produce paints having higher opacity than conventional paints containing an equivalent amount of titanium dioxide and the durability of these paints is better than a conventional paint containing a similar amount of uncoated titanium dioxide.

27 Claims, No Drawings

COMPOSITE PIGMENTARY MATERIAL

This invention relates to a process for the preparation of a composite pigmentary material and in particular to a composite of titanium dioxide particles and chemically distinct particles.

Recently a number of structured composite pigmentary materials have been described. For example UK Patent Application GB 2 267 503A discloses the formation of composite pigmentary particles in which the component particles of the composite are held in association by opposite charges on the surface of the particles.

These composites have been shown to provide improved opacity in surface coatings because, it is believed, the particles of the pigmentary component such as titanium dioxide are more uniformly dispersed in the coatings since the particles with which they are associated act as spacer particles. This improvement in opacity is dependent to some extent upon how efficiently the particles from which the composites are made are dispersed prior to formation of a composite. Dispersions prepared from commercially available titanium dioxide particles normally contain significant proportions of agglomerated primary particles partly because agglomerates are formed during the deposition of inorganic coatings on the titanium dioxide particles and partly because agglomerates formed during storage after formation are difficult to break down.

It is an object of the current invention to provide a process for preparing composite pigments from titanium dioxide in which the titanium dioxide primary particles are efficiently dispersed.

According to the invention a process for the preparation of a structured composite pigmentary material comprises forming an aqueous dispersion of uncoated particles of pigmentary titanium dioxide, said dispersion having a pH value such that the particles of titanium dioxide have a surface charge, subjecting the dispersion to the effects of cross-flow filtration, continuing the cross-flow filtration until the dispersion contains more than 50% by weight titanium dioxide and subsequently mixing said dispersion with a dispersion of chemically distinct particles having a surface charge of opposite sign to the charge on the titanium dioxide particles under conditions such that the mixing does not produce a reversal of the sign of the surface charge on one of the particulate materials, thereby forming a composite pigmentary material in which titanium dioxide particles are held in association with chemically distinct particles as a result of said surface charges.

In a particularly preferred embodiment of the invention the chemically. distinct particles comprise polymeric organic particles.

The invention uses uncoated particles of pigmentary titanium dioxide which has not been deliberately treated to form a surface coating such as a coating of a hydrous inorganic oxide. This titanium dioxide is often referred to as "raw" pigmentary titanium dioxide. Frequently, the titanium dioxide which is used in the process of this invention will be taken directly from a titanium dioxide pigment production process. When the titanium dioxide has been formed by the "sulphate" process the raw material feed for the process of the invention is preferably calciner discharge and when the "chloride" process is used the preferred raw material feed is reactor discharge.

A dispersion of the titanium dioxide is formed initially in the process of this invention. Commonly pigmentary titanium dioxide from either a "sulphate" process or a "chloride" process is milled to adjust its particle size distribution using, for example, bead mills or impact mills. One form of mill frequently used in the titanium dioxide pigment industry is known as a sand mill in which an aqueous suspension of the calciner discharge or reactor discharge is stirred rapidly in the presence of a grinding medium such as sand. The output or "overflow" from a sand mill comprises a well-dispersed suspension of titanium dioxide which is ideal for use in the process of this invention. The good dispersion is retained during processing by cross-flow filtration to form a high solids, well-dispersed slurry of pigmentary titanium dioxide. The use of milling for pigmentary titanium dioxide is not, however, an essential feature of this invention and satisfactory products can be produced using titanium dioxide directly from a "sulphate" or "chloride" process plant and which has not been subjected to a milling process.

When milling is employed, it is often advantageous to subject the titanium dioxide to a washing step which reduces the proportion of soluble salts on the surface of the pigment particles.

Titanium dioxide useful for the process of this invention is normally in the anatase or rutile crystalline form with an average crystal size between 0.1 and 0.4 micrometer. Rutile titanium dioxide for use in the invention preferably has an average crystal size between 0.2 and 0.3 micrometer and pigmentary anatase titanium dioxide an average crystal size between 0.1 and 0.35 micrometer.

An advantage of subjecting the titanium dioxide to a milling step is that this step helps to break down agglomerates of crystals. The effectiveness of the milling can be estimated by measuring the average particle size of the titanium dioxide in the dispersion. Generally, an average particle size in the dispersion between 0.1 and 0.4 micrometer for anatase and between 0.2 and 0.35 micrometer for rutile indicates an efficient dispersion process in which most agglomerates have been disintegrated.

The pH value of the dispersion of titanium dioxide is such that the particles carry a surface charge. When the pH value is below the isoelectric point of the particles this charge is positive and when the pH value is above the isoelectric point this charge is negative. Preferably, a dispersion in which the titanium dioxide particles have a positive surface charge is formed at a pH value in the range 2.0 to 5.5 and a dispersion in which the titanium dioxide particles have a negative surface charge is formed at a pH in the range 7.0 to 13.0. Since many commercially available organic polymeric dispersions suitable for use in this invention contain negatively charged particles it is generally preferred to form a dispersion of titanium dioxide containing positively charged particles when the chemically distinct particles are polymeric organic particles. When necessary, the pH of the dispersion can be adjusted by the addition of acid or alkali.

Frequently, the dispersion of titanium dioxide is formed without addition of dispersing agent. In some applications the presence of dispersing agents has an adverse effect on the performance of the product of the invention. When titanium dioxide is milled on a pigment production plant dispersing agents are often added to aid milling. Dispersing agents which are used include alkanolamines such as monoisopropanolamine, phosphates such as sodium hexametaphosphate and silicates such as sodium silicate. Such dispersing agents can be tolerated in the process of this invention but, when they are present, no further dispersing agent is normally added. If dispersing agents are present the concentration is usually from 0.05 to 0.4 per cent by weight with respect to $TiO_2$ in the dispersion.

The solids content of the dispersion before cross-flow filtration is relatively low in order to ensure good dispersion.

Consequently the solids content is frequently less than 40 per cent titanium dioxide by weight and a typical suspension generated in the production of pigmentary titanium dioxide has a solids content between 20 and 35 per cent by weight.

The dispersion is then subjected to cross-flow filtration in which the dispersion is caused to flow across the surface of a membrane whilst a pressure is applied which tends to cause the water and water soluble components of the dispersion to flow through the membrane which is permeable to the water but not to the dispersed titanium dioxide. Preferably, the water and water soluble components are induced to flow through the membrane by pressure alone without augmentation.

The cross-flow filtration is frequently carried out at normal room temperature but may be operated at a higher temperature such as 30° C. to 80° C.

The precise operating mode of cross-flow filtration will, to some extent, depend upon factors such as the conductivity, the initial and final solids content of the dispersion and the surface area of the membrane employed. Normally, however, it is necessary to recirculate the dispersion across the membrane a number of times to produce a useful increase in solids content of the dispersion from a filtration apparatus of a convenient size. For a batchwise operation, the dispersion is typically recirculated from a reservoir across the membrane and returned to the reservoir until the desired concentration has been achieved. The cross-flow filtration can also be operated as a continuous process in which a number of units containing membranes are employed. The initial dispersion is passed across the surface of a membrane in a first unit and is recirculated a number of times. A proportion of the dispersion is bled to a second unit where it is recirculated over a second membrane system and further concentrated. Any number of units can be linked in this manner to provide an efficient means of obtaining a high solids content in a continuous manner.

Water-soluble ions such as sulphate or chloride ions are frequently present in the dispersion of titanium dioxide. Usually, these ions diffuse through the filtration membrane and their concentration may be lower in the concentrated dispersion than in the initial suspension.

The membrane used in the process of the invention can be any membrane which is suitable for use in cross-flow filtration. Materials from which the membrane can be constructed include porous polymeric materials, porous metals and porous ceramics. A particularly useful membrane comprises a metal mesh composite membrane in which a metal mesh acts as a support for a porous ceramic material such as zirconia. Metal mesh composite membranes are usefully employed as a flat sheet although the membrane can take any convenient form such as a cylindrical tube through which or around which the suspension is caused to flow. Metal mesh composite membranes which are spirally wound within a cylindrical tube have been found to be particularly useful.

Generally a nominal pore size for the membrane between 0.01 and 0.2 micrometer is used. Preferably the nominal pore size is between 0.05 and 0.15 micrometer.

The cross-flow filtration is usually operated with a pressure in excess of atmospheric pressure applied to the dispersion. The usual parameter used to measure the pressure to which the dispersion is subjected is known as the transmembrane pressure. The transmembrane pressure is calculated from the expression $$P_t = \tfrac{1}{2}(P_i + P_o) - P_p$$

where $P_t$ is the transmembrane pressure, $P_i$ is the pressure at which the slurry is introduced to the membrane (inlet pressure), $P_o$ is the pressure at which the slurry leaves the membrane (outlet pressure), $P_p$ is the pressure at which the permeate is removed from the filtration unit.

Frequently, the permeate is removed at atmospheric pressure and $P_t$ is then calculated by taking the average of $P_i$ and $P_o$ where these are expressed as gauge pressures.

Generally, a transmembrane pressure between 0.1 MPa and 1.0 MPa is suitable and a transmembrane pressure between 0.2 MPa and 0.4 MPa is preferred.

It is important to maintain the flow of the dispersion across the surface of the membrane at a high enough rate to prevent significant build-up of solids on the surface and the velocity used will depend upon the construction of the filtration system used. Typically, a cross-flow velocity above 0.5 meter per second and preferably above 1 meter per second is used. In a laboratory-scale apparatus in which a metal mesh composite membrane is used in the form of a flat sheet a cross-flow velocity above 2 meters per second has been found to be particularly useful. Larger initial cross-flow velocities, above 10 meters per second, have been found useful for larger scale equipment.

The cross-flow filtration is continued until the dispersion contains at least 50 per cent titanium dioxide by weight. Preferably, the dispersion contains between 60 and 80 per cent titanium dioxide by weight.

The composite pigmentary material produced by the process of the invention comprises a structured association of particles of titanium dioxide and particles of a chemically distinct material. This chemically distinct material can be any material capable of being processed in accordance with this invention and of a suitable particle size to provide spacing of the titanium dioxide particles in an optically efficient manner. Typical materials include particulate materials frequently used as fillers or extenders such as silica, silicates (for example talc and mica), aluminium oxides and hydroxides, sulphates (for example gypsum and barium sulphate), carbonates (for example calcium carbonate) or clays.

Particles of organic materials such as waxes and agglomerated proteins are also useful and polymeric organic particles are particularly useful. Polymeric organic particles useful in the process of the invention are often referred to as microspheres. A rather wide range of polymers is suitable for the formation of microspheres and a number of different types of microsphere is commercially available. For example microspheres composed of polystyrene, polyvinyl chloride, polyethylene, acrylic polymers and a number of copolymers are available and can be used in the process of this invention.

The polymeric organic particles may comprise solid particles or the particles may contain voids or vesicles. Vesiculated particles can be used to contribute to the pigmentary efficiency of the composite prepared according to the process of the invention.

A dispersion of chemically distinct particles is used in which the particles have a surface charge. Many dispersions of polymeric organic particles are readily available and are suitable for use in this invention. Frequently, commercially available organic polymer dispersions contain negatively charged polymeric particles and therefore they are used in this invention with a dispersion of titanium dioxide containing positively charged particles.

The dispersion of chemically distinct material can be prepared in any convenient manner. As stated hereinbefore dispersions of polymeric organic particles are widely available commercially but other particulate material is usually dispersed by stirring with water, preferably in the absence of a dispersing agent. Preferably dispersions which have been prepared by dispersing dry particulate material are subjected to a milling step to break down any aggregates and to optimise the degree of dispersion of the particles. The milling can be carried out by, for example, high speed impeller mill, ball mill, sand mill or the use of ultrasound.

The dispersion of chemically distinct particles generally contains at least 20 per cent solids by weight. Preferably, it contains at least 30 per cent and more preferably at least 40 per cent solids by weight.

The size of the chemically distinct particles can vary over quite wide limits. Usually there is an average size for the particles at which optimum pigmentary properties are demonstrated by the composite which is the product of the process of this invention. Generally this optimum is in the range 0.02 to 0.5 micrometer. A particularly preferred embodiment comprises rutile titanium dioxide particles with an average crystal size between 0.2 and 0.3 micrometer and polymeric organic particles having an average particle size between 0.04 and 0.3 micrometer. More preferably the average size of the polymeric organic particles is in the range 0.05 to 0.15 micrometer.

It is believed that enhanced opacity of the product of the process of the invention results from the structure of the product in which the chemically distinct particles act as spacers to reduce flocculation of titanium dioxide particles with other titanium dioxide particles (homoflocculation). It is therefore necessary to use proportions of titanium dioxide particles and chemically distinct particles which generate this spacing effect. The preferred proportions depend upon the crystal form of the titanium dioxide and the average sizes of the particles used but, generally, a ratio of chemically distinct particles to titanium dioxide particles in the range 0.3:1 to 3.0:1 by volume is used. In the preferred embodiment using rutile titanium dioxide having an average crystal size in the range 0.2 to 0.3 micrometer and polymeric organic particles a preferred ratio of polymer:$TiO_2$ is from 0.5:1 to 1.7:1 by volume.

The dispersion of titanium dioxide and the dispersion of chemically distinct particles are mixed under conditions such that the signs of the surface charges on the particles are not changed during the mixing process. Frequently, it is possible to form both dispersions at a similar pH value. When the pH values of the two dispersions are substantially similar the process of the invention is readily carded out by mixing these two dispersions whilst the mixture is agitated by any suitable means. In this embodiment it is preferred that the two dispersions have pH values which differ by not more than 1.0 pH unit. Preferably, the pH values differ by not more than 0.5 pH units. Adequate mixing of the two dispersions is effected, for example, by stirring, recirculatory mixing, by simultaneous introduction of the dispersions into separate arms of a T-piece or by exposing the mixture to the effect of ultrasonic vibrations. Typically, one of the dispersions is added to the other dispersion slowly, or the two dispersions are simultaneously introduced into a zone which may be agitated.

It may be necessary, for example when a dispersion has poor stability at a pH value chosen for mixing, to prepare the two dispersions at substantially different pH values. When it is necessary to employ dispersions having substantially different pH values it is important to mix the dispersions under conditions such that the sign of the surface charge on either of the particulate materials is not reversed by any changes in pH which may occur during mixing. For example, it may be necessary to add an acid or a base to adjust the pH during the mixing step.

For example, a suitable pH value for producing a composite from a dispersion of titanium dioxide containing positively charged particles is about 4 to 5. However, commercially available polymeric organic particles are often supplied as a dispersion containing negatively charged particles at a pH of about 7 to 9. Nevertheless, a product according to this invention can be formed from titanium dioxide and polymeric organic particles by adding a commercial dispersion of polymeric organic particles to a dispersion of titanium dioxide at a pH of 4 to 5 whilst the pH of the resultant mixture is maintained in the range of 4 to 5 by the simultaneous addition of an acid.

Analogously, the process can be carried out using a dispersion of titanium dioxide containing negatively charged particles at a pH in the range 7.0 to 13.0 and a dispersion of chemically distinct particles containing positively charged particles which also has a pH in the range 7.0 to 13.0 or by maintaining the pH in the range 7.0 to 13.0 during the mixing process by the addition of acid or alkali when the dispersion of chemically distinct particles has a pH outside this range.

The product of the process of the invention is a dispersion of a structured composite pigmentary material which can be used to prepare coating compositions such as aqueous emulsion paints. These compositions are frequently formulated at a pH in the range 6 to 10 and more commonly in the range 7 to 9. As stated hereinbefore, the process of this invention is frequently carded out at a pH below 6, for example in the range 2.0 to 5.5. In a preferred process a dispersion of titanium dioxide in which the particles have a positive charge is mixed with a dispersion of chemically distinct particles having a negative charge, the mixing taking place at a pH of 3.0 to 5.0 and the pH of the resulting dispersion of structured composite pigment is subsequently adjusted to a value in the range 6 to 10 and preferably 7 to 9.

The products of the process of the invention are useful in producing paints and similar coatings which have a higher opacity than similar paints containing the same volume fraction in the dried paint film of titanium dioxide but prepared according to conventional paint formulation techniques. The process has the advantage that the titanium dioxide is initially prepared in a well-dispersed state and is maintained well-dispersed during the processing steps of the invention. Consequently, the opacity improvement obtained is particularly marked. Surprisingly, although the titanium dioxide particles are not coated with the conventional coatings which are designed to improve the durability of surface coatings containing titanium dioxide, the durability of coatings produced using the products of the invention is better than the durability of conventional coatings containing uncoated titanium dioxide. The ability to utilise uncoated titanium dioxide leads to worthwhile cost-savings.

The invention is illustrated by the following examples.

EXAMPLE 1

The rutile titanium dioxide pigment used in this Example was a conventional reactor discharge slurry obtained from a "chloride" process. The discharge slurry was washed at approximately 50° C. to remove salts on a Moores filter so that the final conductivity was less than 100 μS. This material was then dried and fluid energy milled.

The titanium dioxide was diluted with water, the pH of the resultant slurry was adjusted to 3.5 to 4.0 with hydrochloric acid and the slurry was subjected to laboratory sandmilling using zircon beads with a nominal mean size of 0.6 to 0.8 turn. The milled slurry contained 36.2 per cent titanium dioxide by weight, the pH was 4.1 and the median particle size measured by Malvern Mastersizer MS20 was 0.30 micrometer indicating good dispersion. The slurry had a conductivity of 160 µS.

The dispersion was then concentrated on a laboratory scale cross-flow filtration apparatus (Ceramesh CML 05) using zirconia/metal composite membranes, with a nominal pore size of 0.1 micrometer. The transmembrane pressure was maintained at approximately 0.35 MPa. The dispersion was concentrated at room temperature over 230 minutes without washing. The concentrated dispersion had the following characteristics: $TiO_2$ content (determined gravimetrically) 1403 gram per liter (equivalent to 67.6% $TiO_2$ by weight), conductivity 240 µS, pH 4.2. The mean particle size was determined by X-ray sedimentation (Brookhaven Instruments XDC) as 0.28 micrometer which demonstrates that good dispersion was maintained during concentration A composite pigmentary material was prepared from the concentrated dispersion and a dispersion of polystyrene microspheres having the following characteristics: solids content 50.5% (by gravimetric analysis) and mean particle size 0.065 micrometer (by transmission electron microscopy combined with image analysis—Cambridge Instruments Quantimet 570). The $TiO_2$ and polymer bead dispersions were adjusted to pH 3.7 and pH 4.2 respectively using dilute hydrochloric acid. The concentrated $TiO_2$ dispersion was diluted to 62.7% solids by weight and stirred using a stator-rotor mixer (Silverson) for a few minutes. 908.8 g of the $TiO_2$ dispersion were mixed with 200.0 g of the polystyrene microsphere dispersion by simultaneously pouring the dispersions into a 2 liter vessel during 2 minutes. The mixture was continuously agitated with a blade stirrer during formation and for a further 5 minutes after addition was complete. The pH of the resulting material was adjusted to pH 8.5 by the addition of aqueous ammonium hydroxide.

The product (COMPOSITE A) was analyzed by measuring weight loss after heating in an oven at 110° C. and subsequently at 650° C. It was found to contain 60.0% composite pigmentary material by weight and this material had a polystyrene:$TiO_2$ ratio of 0.93:1 by volume. The conductivity was 3.80 mS.

The dispersion of composite pigmentary material was used to produce an extender-free fully-bound emulsion paint as shown in Table 1 below and labelled "Example 1". A control paint ("Control 1") was prepared by a conventional method at equivalent pigment weight fraction using a conventional grade of titanium dioxide pigment (Tioxide R-TC90) which is coated with hydrous alumina. The characteristics of the paints are shown in Table 2.

The opacity of the paints was determined at constant spreading rate by drawing down films on a polyester (Melinex) film using wire-wound applicator bars and allowing the paint to dry. Contrast ratio was measured using a Pacific Scientific Colorgard Colorimeter and the 60° gloss was determined with a Labotron gloss meter. Colours were measured with a Pacific Scientific colorimeter on paint films produced by drawing down a film on a white card substrate and allowing the film to dry. The results are given in Table 3.

TABLE 1

| Ingredient | Parts by weight | |
|---|---|---|
| | Example 1 | Control 1 |
| Water | 25.04 | 35.77 |
| Cellulosic Thickener (Cellosize QP4400) | 0.52 | 0.63 |
| Ammonia (0.880 solution) | 0.40 | 0.49 |
| Sodium salt of polycarboxylic acid (Dispex N40) | 0.51 | 0.62 |
| Nonionic surfactant (Triton CF10) | 0.04 | 0.05 |
| Coalescing solvent (Texanol) | 1.89 | 2.30 |
| Defoaming agent (Foamaster E75C) | 0.14 | 0.17 |
| Biocide (Acticide BX) | 0.14 | 0.17 |
| Titanium dioxide (Tioxide R-TC90) | — | 17.85 |
| COMPOSITE A | 36.78 | — |
| Vinyl acetate-VeoVa10 copolymer emulsion (Vinamul 6955) | 34.54 | 41.96 |

TABLE 2

| | Example 1 | Control 1 |
|---|---|---|
| WET paint: | | |
| Weight solids (%) | 41.58 | 41.56 |
| Volume solids (%) | 30.02 | 30.01 |
| DRIED paint: | | |
| $TiO_2$ volume fraction | 17.10 | 18.01 |
| Bead volume fraction | 15.74 | — |

TABLE 3

| | Example 1 | Control 1 |
|---|---|---|
| Contrast ratio at 20 m²/l | 91.1 | 90.3 |
| Colour | | |
| L | 97.7 | 97.4 |
| a | −0.5 | −0.4 |
| b | 0.5 | 0.6 |
| Gloss 60° (%) | 43 | 46 |

EXAMPLE 2

A sample of the washed $TiO_2$ reactor discharge as used for Example 1 was sandmilled on a pilot plant at initial pH of 3–4 using Ottawa sand. This sandmilled dispersion had the following characteristics: $TiO_2$ content 480 grams per liter (equivalent to 35.1% $TiO_2$ by weight) conductivity 4.0 mS, pH 4.5. The dispersion was concentrated using the laboratory cross-flow filtration apparatus described in Example 1 with a transmembrane pressure of 0.36 MPa at ambient temperature over 300 minutes. The concentrated slurry had the following characteristics:$TiO_2$ content 1343 grams per liter (equivalent to 66.2% $TiO_2$ by weight), conductivity 1.39 mS, pH 3.8. The median particle size was determined (Malvern) as 0.32 micrometer which is indicative of good dispersion.

A portion of this dispersion was then diluted to 62.4% solids by weight and stirred using a stator-rotor mixer (Silverson) for a few minutes. A composite pigmentary material was prepared from this diluted dispersion and a dispersion of polystyrene micro spheres having the following characteristics solids content 49.3% (by gravimetric analysis) and mean particle size 0.10 micrometer (by transmission electron microscopy combined with image analysis—Cambridge Instruments Quantimet 570).

Both dispersions were adjusted to pH 3.7 with hydrochloric acid prior to preparation of the composite pigmentary material. 893.8 g of the TiO$_2$ dispersion were mixed with 200.0 g of the polystyrene microsphere dispersion by simultaneously pouring the dispersions into a 2 liter vessel during 2 minutes. The mixture was continuously agitated with a blade stirrer during formation and for a further 5 minutes after addition was complete. The pH of the resulting material was subsequently adjusted to pH 8.7 by the addition of aqueous ammonium hydroxide.

The product (COMPOSITE B) was analyzed by measuring weight loss after heating in an oven at 110° C. and subsequently at 650° C. It was found to contain 60.1% composite pigmentary material by weight and this material had a polystyrene:TiO$_2$ ratio of 0.70:1 by volume.

The dispersion of composite pigmentary material was used to produce an extender-free fully-bound emulsion paint as shown in Table 4 below and labelled "Example 2". A control paint ("Control 2") was prepared using portions of the same TiO$_2$ sandmilled slurry and polystyrene dispersion from which the composite material had been prepared. However these were added conventionally to the control paint. The paint characteristics are shown in Table 5.

The opacity of the paints was determined at constant spreading rate (20 m$^2$/l) in the same manner as described in Example 1 and the results are shown in Table 5.

The paints shown in Table 4 were applied to 152 mm×64 mm stainless steel panels by brushing: three coats were applied and the paints were allowed to dry for 24 hours between each application. The paints were then allowed to dry for a further 14 days prior to testing in an accelerated weathering machine (Xenotest). The panels were removed at regular intervals of exposure to ultraviolet light and the extent to which unbound TiO$_2$ had appeared on the panels ("chalking") was assessed and rated on a scale of 0 to 5 with a rating of 0 indicating negligible chalking and 5 indicating severe chalking. The results are shown in Table 6.

TABLE 4

| | Parts by weight | |
|---|---|---|
| Ingredient | Example 2 | Control 2 |
| Water | 24.77 | 26.53 |
| Cellulosic Thickener (Cellosize QP4400) | 0.55 | 0.55 |
| Ammonia (0.880 solution) | 0.42 | 0.42 |
| Sodium salt of polycarboxylic acid (Dispex N40) | 0.54 | 0.54 |
| Nonionic surfactant (Triton CF10) | 0.04 | 0.04 |
| Coalescing solvent (Texanol) | 2.00 | 2.00 |
| Defoaming agent (Foamaster E75C) | 0.15 | 0.15 |
| Biocide (Nuosept 95) | 0.15 | 0.15 |
| COMPOSITE B | 34.91 | — |
| Sandmilled slurry containing 66.6% TiO$_2$ | — | 26.80 |
| Bead dispersion containing 49.3% polystyrene | — | 6.34 |
| Vinyl acetate-VeoVa10 copolymer emulsion (Vinamul 6955) | 36.48 | 36.48 |

TABLE 5

| | Example 2 | Control 2 |
|---|---|---|
| WET paint: | | |
| Weight solids (%) | 41.60 | 41.59 |
| Volume solids (%) | 30.00 | 30.01 |

TABLE 5-continued

| | Example 2 | Control 2 |
|---|---|---|
| DRIED paint: | | |
| TiO$_2$ volume fraction | 17.08 | 17.08 |
| Bead volume fraction | 11.84 | 11.84 |
| OPACITY RESULTS: | | |
| Contrast ratio @ 20 m$^2$/l | 90.0 | 88.2 |

TABLE 6

| | Chalk Rating | |
|---|---|---|
| Xenotest Exposure (hours) | Example 2 | Control 2 |
| 700 | 0 | 0 |
| 1000 | 0 | 3 |
| 1300 | 3 | 5 |
| 1600 | 5 | 5 |

We claim:

1. A process for the preparation of a structured composite pigmentary material comprising forming an aqueous dispersion of uncoated particles of pigmentary titanium dioxide, said dispersion having a pH value such that the particles of titanium dioxide have a surface charge, subjecting the dispersion to the effects of cross-flow filtration, continuing the cross-flow filtration until the dispersion contains more than 50 per cent by weight titanium dioxide and subsequently mixing said dispersion with a dispersion of chemically distinct particles having a surface charge of opposite sign to the charge on the titanium dioxide particles under conditions such that the mixing does not produce a reversal of the sign of the surface charge on one of the particulate materials, thereby forming a composite pigmentary material in which titanium dioxide particles are held in association with chemically distinct particles as a result of said surface charges.

2. A process according to claim 1 in which the chemically distinct particles comprise polymeric organic particles.

3. A process according to claim 2 in which the polymeric particles contain voids or vesicles.

4. A process according to claim 2 in which the polymeric particles have a negative surface charge.

5. A process according to claim 1 in which the chemically distinct material is selected from the group consisting of silica, silicates, aluminium oxide, aluminium hydroxide, sulphates, carbonates, clays, waxes and proteins.

6. A process according to claim 1 in which the dispersion of chemically distinct particles is prepared in the absence of a dispersing agent.

7. A process according to claim 1 in which the dispersion of chemically distinct particles is subjected to a milling step using a milling means selected from the group consisting of high speed impeller mills, ball mills, sand mills and ultrasound.

8. A process according to claim 1 in which the dispersion of chemically distinct particles contains at least 20 per cent solids by weight.

9. A process according to claim 1 in which the titanium dioxide is milled and subjected to a washing step to reduce the proportion of soluble salts on the surface of the particles.

10. A process according to claim 1 in which the titanium dioxide has an average crystal size between 0.1 and 0.4 micrometer.

11. A process according to claim 10 in which the titanium dioxide is rutile titanium dioxide having an average crystal size between 0.2 and 0.3 micrometer.

12. A process according to claim 1 in which the titanium dioxide is rutile titanium dioxide having an average particle size in the dispersion between 0.2 and 0.35 micrometer.

13. A process according to claim 1 in which the dispersion of titanium dioxide has a pH value in the range 2.0 to 5.5.

14. A process according to claim 1 in which the dispersion of titanium dioxide contains a dispersing agent at a concentration from 0.05 to 0.4 per cent by weight with respect to titanium dioxide in the dispersion.

15. A process according to claim 1 in which the dispersion of titanium dioxide has a concentration prior to cross-flow filtration of less than 40 per cent titanium dioxide by weight.

16. A process according to claim 1 in which during the cross-flow filtration the water and water soluble components are induced to flow through the membrane by pressure alone.

17. A process according to claim 1 in which the cross-flow filtration is carried out at a temperature in the range 30° C. to 80° C.

18. A process according to claim 1 in which the cross-flow filtration utilises a membrane comprising a metal mesh supporting a porous ceramic material.

19. A process according to claim 1 in which the cross-flow filtration utilises a membrane having a nominal pore size between 0.01 and 0.2 micrometer.

20. A process according to claim 1 in which the cross-flow filtration is carried out at a transmembrane pressure between 0.1 MPa and 1.0 MPa.

21. A process according to claim 1 in which the cross-flow filtration uses a cross-flow viscosity above 0.5 meter per second.

22. A process according to claim 1 in which the cross-flow filtration is continued until the dispersion of titanium dioxide contains between 60 and 80 per cent titanium dioxide by weight.

23. A process according to claim 1 in which the chemically distinct particles have an average particle size in the range 0.02 to 0.5 micrometer.

24. A process according to claim 1 in which the chemically distinct particles and the titanium dioxide are present in the composite pigmentary material in a ratio of chemically distinct particles to titanium dioxide in the range 0.3:1 to 3.0:1 by volume.

25. A process according to claim 1 in which the pH values of the dispersion of titanium dioxide particles and the dispersion of chemically distinct particles differ by not more than 1 pH unit when the two dispersions are mixed.

26. A process according to claim 1 in which a dispersion of titanium dioxide at a pH of 4 to 5 is mixed with a dispersion of polymeric organic particles having a pH of 6 to 9 whilst the pH of the resultant mixture is maintained in the range 4 to 5 by simultaneous addition of an acid.

27. A process according to claim 1 in which the dispersion of titanium dioxide and the dispersion of chemically distinct particles are mixed at a pH in the range 3 to 5 and the pH of the resulting dispersion of structured composite pigment is subsequently adjusted to a value in the range 6 to 10.

\* \* \* \* \*